US012749391B2

(12) United States Patent
Miyamoto et al.

(10) Patent No.: US 12,749,391 B2
(45) Date of Patent: Sep. 29, 2026

(54) COMMUNICATION SYSTEM, STORAGE MEDIUM, AND COMMUNICATION METHOD

(71) Applicant: FURUKAWA ELECTRIC CO., LTD., Tokyo (JP)

(72) Inventors: Ryotaka Miyamoto, Tokyo (JP); Kenichi Goto, Tokyo (JP); Yan Xie, Tokyo (JP); Tomoaki Terasaki, Tokyo (JP); Masahiro Asami, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 427 days.

(21) Appl. No.: 18/184,256

(22) Filed: Mar. 15, 2023

(65) Prior Publication Data

US 2023/0298458 A1 Sep. 21, 2023

(30) Foreign Application Priority Data

Mar. 16, 2022 (JP) ................................ 2022-040967

(51) Int. Cl.
*G08G 1/01* (2006.01)
*G08G 1/052* (2006.01)
(Continued)

(52) U.S. Cl.
CPC ........... *G08G 1/0116* (2013.01); *G08G 1/052* (2013.01); *H04W 4/44* (2018.02); *H04W 36/322* (2023.05)

(58) Field of Classification Search
CPC ....... H04W 4/02; H04W 4/026; H04W 4/027; H04W 4/029; H04W 28/26; H04W 36/32;
(Continued)

(56) References Cited

U.S. PATENT DOCUMENTS 12,548,439 B2 * 2/2026 Terasaki .................... G08G 1/04
2002/0080778 A1 * 6/2002 Matsugatani ......... H04W 36/14 370/352

(Continued)

FOREIGN PATENT DOCUMENTS

CN 109842558 A * 6/2019 ............. H04L 12/46
JP 2015207935 A * 11/2015

(Continued)

OTHER PUBLICATIONS

Guo, Hongzhi et al., "FiWi Enhanced Vehicular Edge Computing Networks: Collaborative Task Offloading", IEEE Vehicular Technology Magazine, Mar. 2019, pp. 45 to 53 (Year: 2019).*

(Continued)

*Primary Examiner* — David A Testardi
(74) *Attorney, Agent, or Firm* — Oblon, McClelland, Maier & Neustadt, L.L.P.

(57) ABSTRACT

A communication system includes: a plurality of roadside units installed in respective areas that acquires travel information about a vehicle through radio communication; a first terminal connected to the plurality of roadside units; and a server that executes control as a control plane to acquire the travel information from the roadside unit, predict the roadside unit belonging to the plurality of roadside units and installed in an intended area where the vehicle is predicted to travel and predict arrival time at the intended area based on the acquired travel information, and manage communication through the roadside unit and the first terminal so as to construct a communication path between the predicted roadside unit and the first terminal before the arrival time.

6 Claims, 8 Drawing Sheets

(51) Int. Cl.
*H04W 4/44* (2018.01)
*H04W 36/32* (2009.01)

(58) Field of Classification Search
CPC . H04W 36/322; H04W 36/324; H04W 64/00; H04W 64/003; H04W 64/006; H04W 4/40; H04W 4/44; H04Q 11/067; H04Q 2011/0073; G08G 1/0116; G08G 1/052; G08G 1/0112; H04L 45/74–748
See application file for complete search history.

(56) References Cited

U.S. PATENT DOCUMENTS

| | | | | |
|---|---|---|---|---|
| 2006/0291659 | A1* | 12/2006 | Watanabe | H04W 12/062 380/270 |
| 2008/0095163 | A1* | 4/2008 | Chen | H04L 45/16 370/392 |
| 2008/0304828 | A1* | 12/2008 | Mizutani | H04Q 11/0067 398/78 |
| 2009/0203394 | A1* | 8/2009 | Shaffer | H04W 36/322 455/525 |
| 2009/0219900 | A1* | 9/2009 | Kokkinen | H04W 28/26 370/338 |
| 2009/0245805 | A1* | 10/2009 | Akasaka | H04B 10/1125 398/128 |
| 2010/0086304 | A1* | 4/2010 | Mizutani | H04J 14/0282 398/71 |
| 2010/0323715 | A1* | 12/2010 | Winters | H04W 36/008375 340/988 |
| 2013/0115954 | A1* | 5/2013 | Charbit | H04W 36/322 455/437 |
| 2014/0323130 | A1* | 10/2014 | Kowshik | H04W 36/008375 455/436 |
| 2015/0289110 | A1* | 10/2015 | Kilpatrick, II | H04W 60/04 455/456.1 |
| 2015/0304913 | A1* | 10/2015 | Uusitalo | H04W 4/02 455/444 |
| 2016/0323715 | A1* | 11/2016 | Leroux | H04W 4/029 |
| 2017/0339623 | A1* | 11/2017 | Pillay-Esnault | H04L 45/74 |
| 2018/0063261 | A1* | 3/2018 | Moghe | G07C 5/008 |
| 2018/0205574 | A1* | 7/2018 | Radunovic | H04L 41/0659 |
| 2019/0028862 | A1 | 1/2019 | Futaki | |
| 2019/0104458 | A1* | 4/2019 | Svennebring | H04L 45/42 |
| 2019/0273624 | A1* | 9/2019 | Hoffmann | H04W 4/24 |
| 2019/0289505 | A1* | 9/2019 | Thomas | H04W 68/04 |
| 2019/0372698 | A1* | 12/2019 | Hisano | H04L 12/44 |
| 2020/0162990 | A1* | 5/2020 | Reimann | H04L 67/12 |
| 2020/0213226 | A1* | 7/2020 | Zheng | H04L 49/70 |
| 2020/0221349 | A1* | 7/2020 | Nakata | H04W 4/44 |
| 2020/0252769 | A1* | 8/2020 | Alieiev | G01C 21/3691 |
| 2021/0314839 | A1* | 10/2021 | Çetinkaya et al. | H04W 4/027 |
| 2023/0316904 | A1* | 10/2023 | Terasaki | G08G 1/04 701/23 |

FOREIGN PATENT DOCUMENTS

| | | | | |
|---|---|---|---|---|
| JP | 2015233324 | A * | 12/2015 | |
| JP | 2019106674 | A * | 6/2019 | |
| JP | 2021-77999 | A | 5/2021 | |
| WO | WO 2017/046979 | A1 | 3/2017 | |
| WO | WO-2021080332 | A2 * | 4/2021 | G06Q 10/04 |

OTHER PUBLICATIONS

Japanese Office Action mailed on Feb. 27, 2024 in Japanese Patent Application No. 2022-040987 (with machine translation), 5 pages.
Japanese Office Action issued May 14, 2024 in Japanese Patent Application No. 2022-040967 (with unedited computer-generated English Translation), 5 pages.
IEEE Std 802.1D™-2004, "IEEE Standard for Local and Metropolitan Area Networks: Media Access Control (MAC) Bridges" IEEE Computer Society, 2004, 281 pages.
IEEE Std 802.3™-2022, "IEEE Standard for Ethernet" IEEE Computer Society, 2022, 7,025 pages.

* cited by examiner

COMMUNICATION SYSTEM, STORAGE MEDIUM, AND COMMUNICATION METHOD

This application is based on and claims the benefit of priority from Japanese Patent Application No. 2022-040967, filed on 16 Mar. 2022, the content of which is incorporated herein by reference.

BACKGROUND OF THE INVENTION

Field of the Invention

The present invention relates to a communication system, a storage medium, and a communication method.

Related Art

There is a conventionally-known communication system relating to road-to-vehicle communication made between a vehicle and a roadside unit, for example. Non-Patent Documents 1 and 2 are given as examples of documents relating to communication technology used in such a system. Non-Patent Document 1 describes a spanning tree protocol as a standard set for path selection. Non-Patent Document 2 describes technology relating to a connection scheme such as LAN.

Non-Patent Document 1: IEEE802.1D

Non-Patent Document 2: IEEE802.3

SUMMARY OF THE INVENTION

In a case of a traveling vehicle, in order not to interrupt communication, it is required to smoothly perform operation of switching a roadside unit as a communication counterpart. Furthermore, for making road-to-vehicle communication, it is required to construct a system over a wide area, and to operate and manage the said system. Hence, reducing infrastructure costs is desired. However, Non-Patent Document 1 or Non-Patent Document 2 does not describe the technology for smoothly switching between roadside units to communicate with a vehicle, or the technology to reduce costs for the infrastructure.

The present invention is intended to provide a communication system, a storage medium, and a communication method capable of smoothly switching between roadside units that makes radio communication with a traveling vehicle while reducing infrastructure costs.

The present invention relates to a communication system including: a plurality of roadside units installed in respective areas that acquires travel information about a vehicle through radio communication; a terminal to which the plurality of roadside units is connected; and a server that executes control as a control plane to acquire the travel information from the roadside unit, predicting the roadside unit belonging to the plurality of roadside units and installed in an intended area where the vehicle is predicted to travel and predict arrival time at the intended area based on the acquired travel information, and manage communication through the roadside unit and the terminal so as to construct a communication path between the predicted roadside unit and the terminal before the arrival time.

The traveling information may include positional information, velocity information, destination information, and steering information about the vehicle.

The communication system may further include a plurality of ONUs connected to the terminal, and the terminal may be an OLT and may form a PON access system together with a plurality of the ONUs.

The roadside unit may acquire identification information about the vehicle, and the server may determine based on the identification information whether the vehicle is a route-set vehicle for which its destination is determined in advance, and if the vehicle is determined to be a route-set vehicle, the server may predict two or more of the plurality of roadside units located in the intended area where the vehicle is predicted to pass through before arriving at its destination as the route-set vehicle, and construct a communication path between each of the two or more predicted roadside units and the terminal.

The present invention further relates to a communication method executed by a communication system including a plurality of roadside units installed in respective areas, and a terminal to which the plurality of roadside units is connected. The method includes: a travel information acquisition step of acquiring travel information about a vehicle through radio communication from the roadside unit; a prediction step of predicting the roadside unit belonging to the plurality of roadside units and installed in an intended area where the vehicle is predicted to travel and predicting the arrival time at the intended area based on the travel information acquired in the travel information acquisition step; and a communication control step of executing control as a control plane to manage communication through the roadside unit and the terminal so as to construct a communication path between the roadside unit predicted in the prediction step and the terminal before the arrival time.

The present invention further relates to a non-transitory computer-readable storage medium storing a program where a computer incorporated in the communication system to execute a function. The communication system includes a plurality of roadside units installed in their respective areas, and a terminal to which the plurality of roadside units is connected. The function includes: a travel information acquisition function of acquiring travel information about a vehicle through radio communication from the roadside unit; a prediction function of predicting the roadside unit belonging to the plurality of roadside units and installed in an intended area where the vehicle is predicted to travel and predicting the arrival time at the intended area based on the travel information acquired by the travel information acquisition function; and a communication control function of executing control as a control plane to manage communication through the roadside unit and the terminal so as to construct a communication path between the roadside unit predicted by the prediction function and the terminal before the arrival time.

According to the present invention, it is possible to smoothly switch between roadside units to make radio communication with a traveling vehicle while also reducing infrastructure costs.

DETAILED DESCRIPTION OF THE INVENTION

Figure 1:
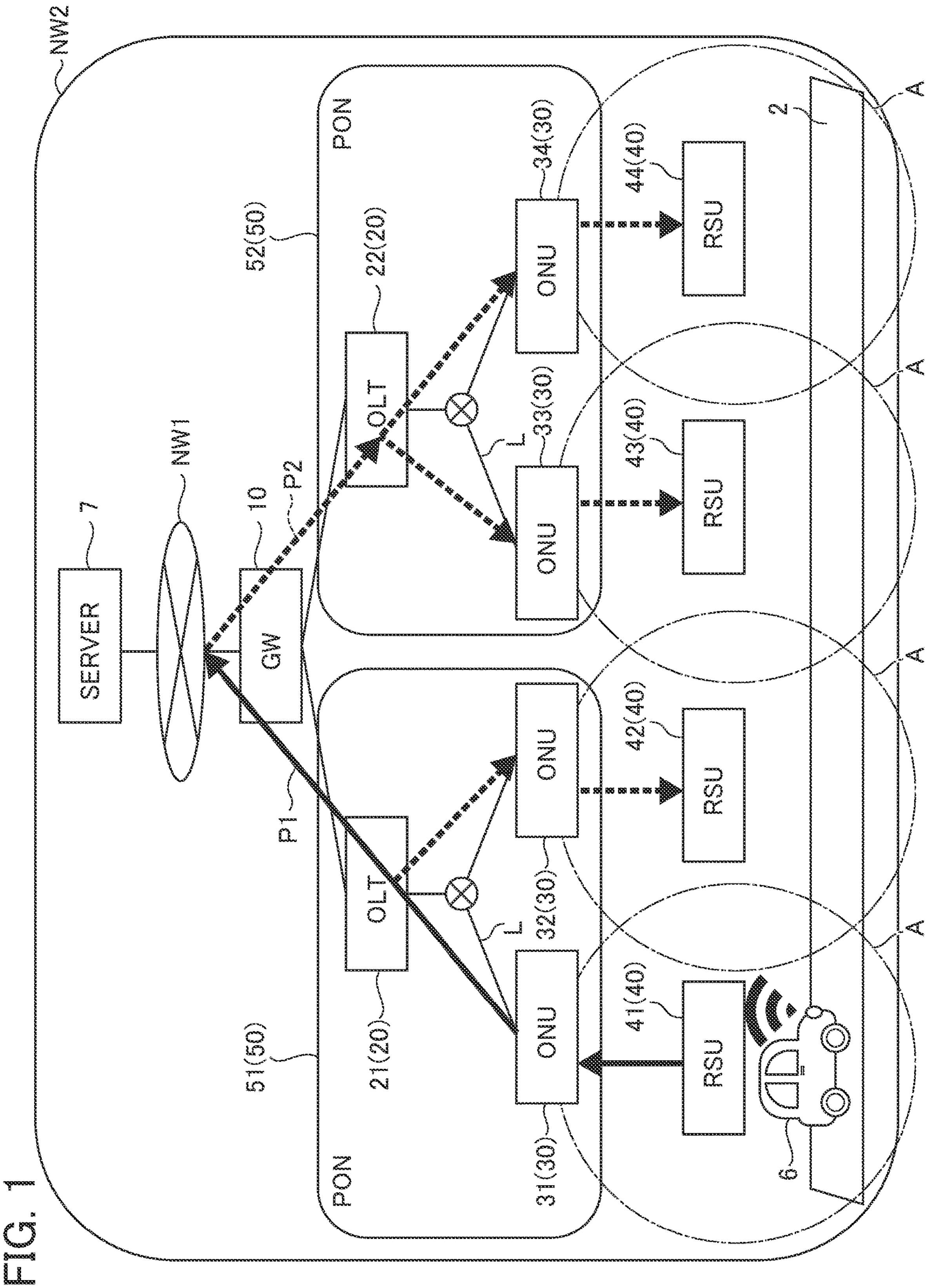
FIG. 1 is a schematic view showing a communication system according to an embodiment of the present invention.

An embodiment of the present invention will be described below by referring to the drawings. However, the embodiment described below is not intended to limit the present invention. In each of the drawings referred to in the following description, shapes, sizes, and positional relationships are schematically illustrated only to an extent to which the substance of the present disclosure can be understood. Namely, the present invention is not limited only to the shapes, sizes, and positional relationships illustrated in each drawing.

An overall configuration of a communication system 1 according to an embodiment of the present invention will be described by referring to FIG. 1. FIG. 1 is a schematic view showing the communication system 1 according to the present embodiment.

The communication system 1 is a system for making road-to-vehicle communication between a roadside unit 40 installed on a road 2 and a vehicle 6 stopping or traveling on the road 2. As shown in FIG. 1, the communication system 1 includes a server 7, a gateway 10 connected to the server 7 through a network communication grid NW, a plurality of first terminals 20, a plurality of second terminals 30, and a plurality of roadside units 40 installed on the road 2.

The roadside unit 40 is also known as RSU, for example. The roadside unit 40 is installed around (along a side of) the road 2, for example. The roadside unit 40 makes radio communication with the vehicle 6 to provide vehicle-to-everything (V2X) communication service including vehicle-to-infrastructure (V2I) and vehicle-to-network (V2N).

The second terminal 30 is an optical network unit (ONU), for example. The second terminal 30 connects a line L and the roadside unit 40 to each other. The line L is a communication line formed of an optical fiber, for example. In the communication system 1 shown in FIG. 1, each of second terminals 31 to 34 corresponding to a plurality of the second terminals 30 is connected to one roadside unit 40. Specifically, the second terminal 31 is connected to a roadside unit 41, the second terminal 32 is connected to a roadside unit 42, the second terminal 33 is connected to a roadside unit 43, and the second terminal 34 is connected to a roadside unit 44.

The first terminal 20 is an optical line terminal (OLT), for example. The first terminal 20 connects the line L and the gateway 10 to each other. In the communication system 1 shown in FIG. 1, each of first terminals 21 and 22 corresponding to a plurality of the first terminals 20 is connected to two or more second terminals 30 through the line L to form a PON access system 50 using a passive optical network (PON). In the example shown in FIG. 1, a PON access system 51 is configured using the first terminal 21, the second terminals 31 and 32, and others, and a PON access system 52 is configured using the first terminal 22, the second terminals 33 and 34, and others. While not shown in FIG. 1, the second terminals 30 amounting to a number of equal to or greater than about 6000 is connectable to one first terminal 20, for example.

The gateway 10 connects a plurality of the PON access systems 50 and the network communication grid NW to each other.

The server 7 connects to a plurality of the PON access systems 50 through the network communication grid NW and the gateway 10. The server 7 controls communication operation as a control plane in the communication system 1.

As shown in FIG. 1, if the vehicle 6 in a communicable area A able to communicate with the roadside unit 41, is traveling toward the roadside unit 42, for example, it is required to perform a process of switching the roadside unit 40 to make radio communication with the vehicle 6 from the roadside unit 41 to the roadside unit 42 (this process will be called a handover process). If the vehicle 6 goes out of the communicable area A, communicable with the roadside unit 41, before switching the roadside unit 40 to make radio communication, the communication is terminated. The handover process is required to be performed more smoothly, particularly if the vehicle 6 travels at a higher speed or if the communicable area A, communicable with the roadside unit 40 is smaller. In recent years, transition to the communication system such as the fifth generation mobile communication system (5G) where the range of communicable area A is relatively smaller, has increased the demand for the technology of performing the handover process smoothly while reliably avoiding interruptions of communication. Moreover, a system is constructed over a wide area in many cases of road-to-vehicle communication. While not shown in FIG. 1, a large number of the PON access systems 50 or a network topology different from the PON access system 50 may be mixed in presence. This causes burdensome work and raises costs for maintenance and management of the communication system 1. In response to this, the communication system 1 according to the present embodiment allows the handover process to be performed smoothly while reducing infrastructure costs.

Figure 2:
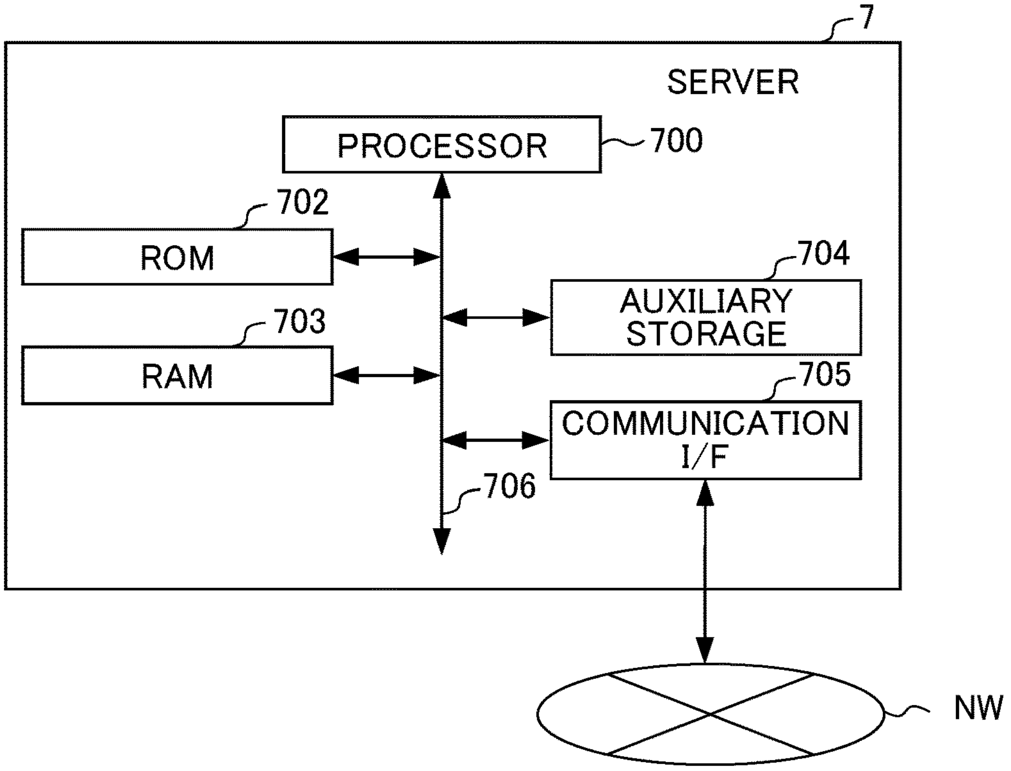
FIG. 2 is a block diagram showing a hardware configuration of a server according to an embodiment of the present invention.

An example of a hardware configuration of the server 7 will be described. FIG. 2 is a block diagram showing the hardware configuration of the server 7.

As an example, the server 7 includes a processor 700, a read-only memory (ROM) 702, a random-access memory (RAM) 703, an auxiliary storage 704, and a communication interface (I/F) 705. These units are connected to each other through a bus 706 and others.

The processor 700 corresponds to a core unit of a computer responsible for processes including calculation and control required for the operation of the server 7. For example, the processor 700 is a central processing unit (CPU), a micro processing unit (MPU), a system on a chip (SoC), a digital signal processor (DSP), a graphics processing unit (GPU), a vision processing unit (VPU), an application-specific integrated circuit (ASIC), a programmable logic device (PLD), or a field-programmable gate array (FPGA). Alternatively, the processor 700 is configured by combining two or more of these units. The processor 700 controls each unit in order to fulfill various functions of the server 7 using programs such as firmware, system software, and application software stored in the ROM 702 or the auxiliary storage 704, for example. The processor 700 performs processes described later using these programs. Some or all of these programs may be incorporated into a circuit in the processor 700.

The ROM 702 and the RAM 703 correspond to main storages of the computer including the processor 700 as a core. The ROM 702 is a non-volatile memory used exclusively for reading of data. For example, the ROM 702 stores the firmware of the above-described programs. The ROM 702 further stores data and others used by the processor 700 in performing various types of processes. The RAM 703 is a memory used for reading and writing of data. The RAM 703 is used as a work area, for example, in which data temporarily used by the processor 700 in performing various types of processes is stored. Typically, the RAM 703 is a volatile memory.

The auxiliary storage 704 corresponds to an auxiliary storage of the computer including the processor 700 as a core. For example, the auxiliary storage 704 is an electric erasable programmable read-only memory (EEPROM), a hard disk drive (HDD), or a flash memory. For example, the auxiliary storage 704 stores the system software and the application software of the above-described programs. The auxiliary storage 704 further stores data used by the processor 700 in performing various types of processes, data generated by implementation of the processes by the processor 700, various types of set values, and others.

The communication I/F 705 is an interface for the server 7 to make communication through the network communication grid NW, and others.

The bus 706 includes a control bus, an address bus, a data bus, and others, and is used for carrying signals transferred between the units of the server 7.

Figure 3:
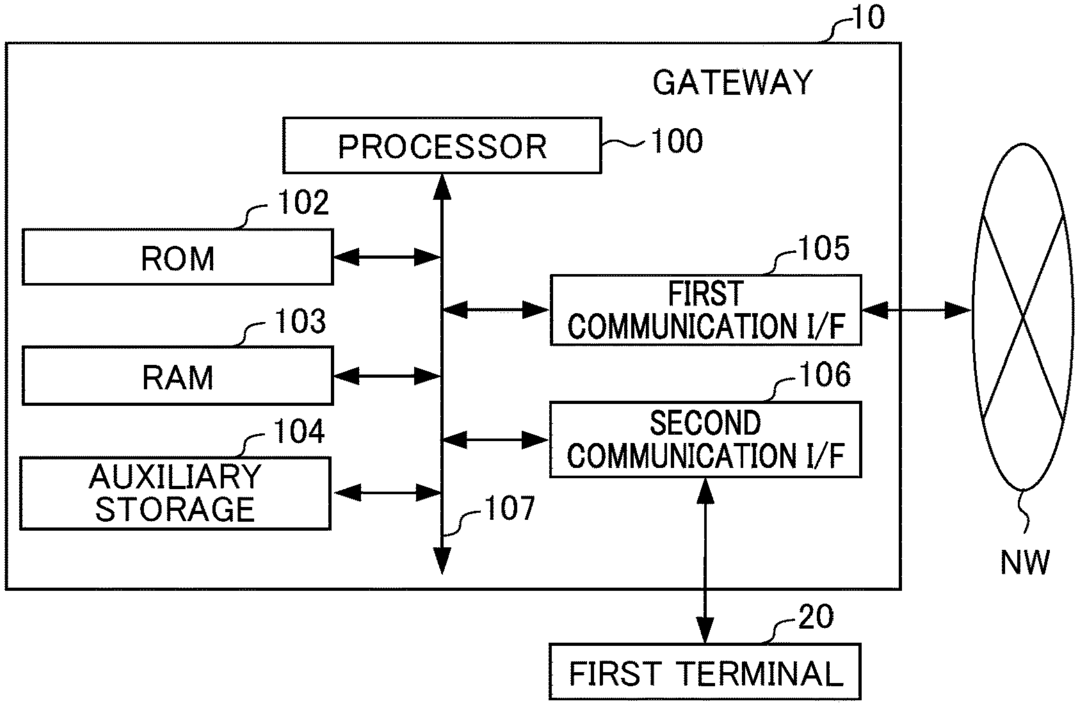
FIG. 3 is a block diagram showing a hardware configuration of a gateway according to an embodiment of the present invention.

An example of a hardware configuration of the gateway 10 will be described next. FIG. 3 is a block diagram showing the hardware configuration of the gateway 10.

As an example, the gateway 10 includes a processor 100, a ROM 102, a RAM 103, an auxiliary storage 104, a first communication I/F 105, and a second communication I/F 106. These units are connected to each other through a bus 107 and others. The processor 100, the ROM 102, the RAM 103, the auxiliary storage 104, and the bus 107 of the gateway 10 have configurations similar to those of the above-described functional blocks of the server 7 given the same names, so that descriptions thereof will be omitted.

The first communication I/F 105 is an interface for the gateway 10 to make communication through the network communication grid NW and others.

The second communication I/F 106 is an interface for the gateway 10 to make communication through the PON access system 50 and others. The gateway 10 connects the network communication grid NW and the PON access system 50 to each other using the first communication I/F 105 and the second communication I/F 106.

Figure 4:
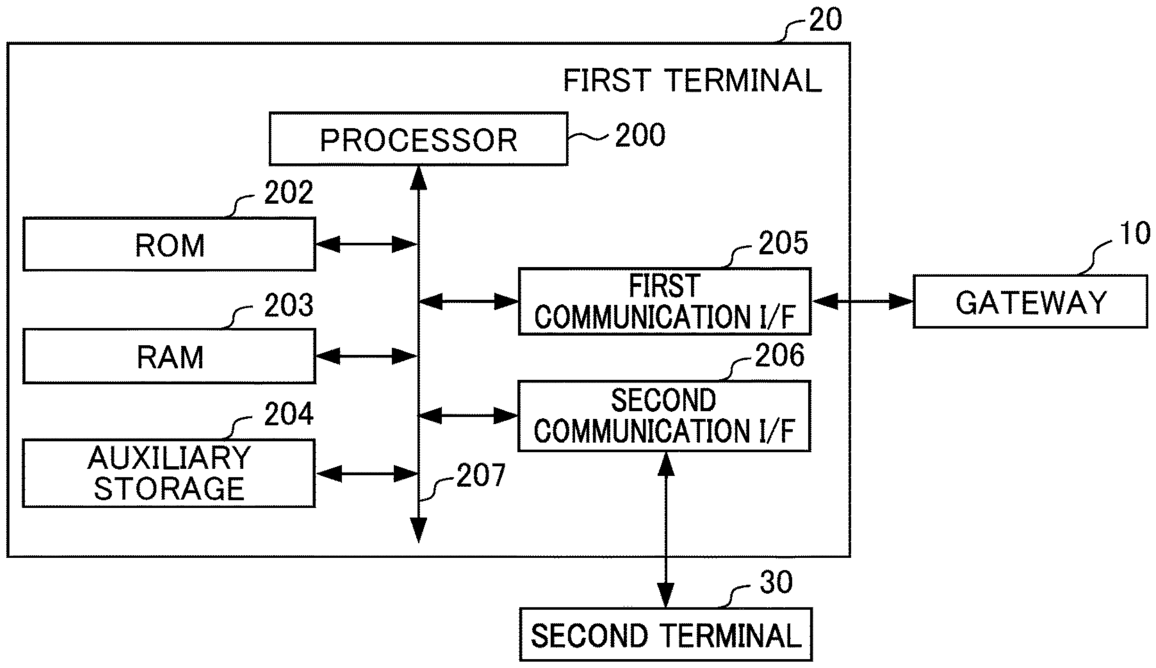
FIG. 4 is a block diagram showing a hardware configuration of a first terminal according to an embodiment of the present invention.

An example of a hardware configuration of the first terminal 20 will be described next. FIG. 4 is a block diagram showing the hardware configuration of the first terminal 20.

As an example, the first terminal 20 includes a processor 200, a ROM 202, a RAM 203, an auxiliary storage 204, a first communication I/F 205, and a second communication I/F 206. These units are connected to each other through a bus 207 and others. The processor 200, the ROM 202, the RAM 203, the auxiliary storage 204, and the bus 207 of the first terminal 20 have configurations similar to those of the above-described functional blocks of the server 7 given the same names, so that descriptions thereof will be omitted.

The first communication I/F 205 is an interface for the first terminal 20 to make communication through the gateway 10, the network communication grid NW, and others.

The second communication I/F 206 is an interface for the first terminal 20 to make communication through the line L and others. The first terminal 20 connects the line L and the network communication grid NW to each other using the first communication I/F 205 and the second communication I/F 206.

Figure 5:
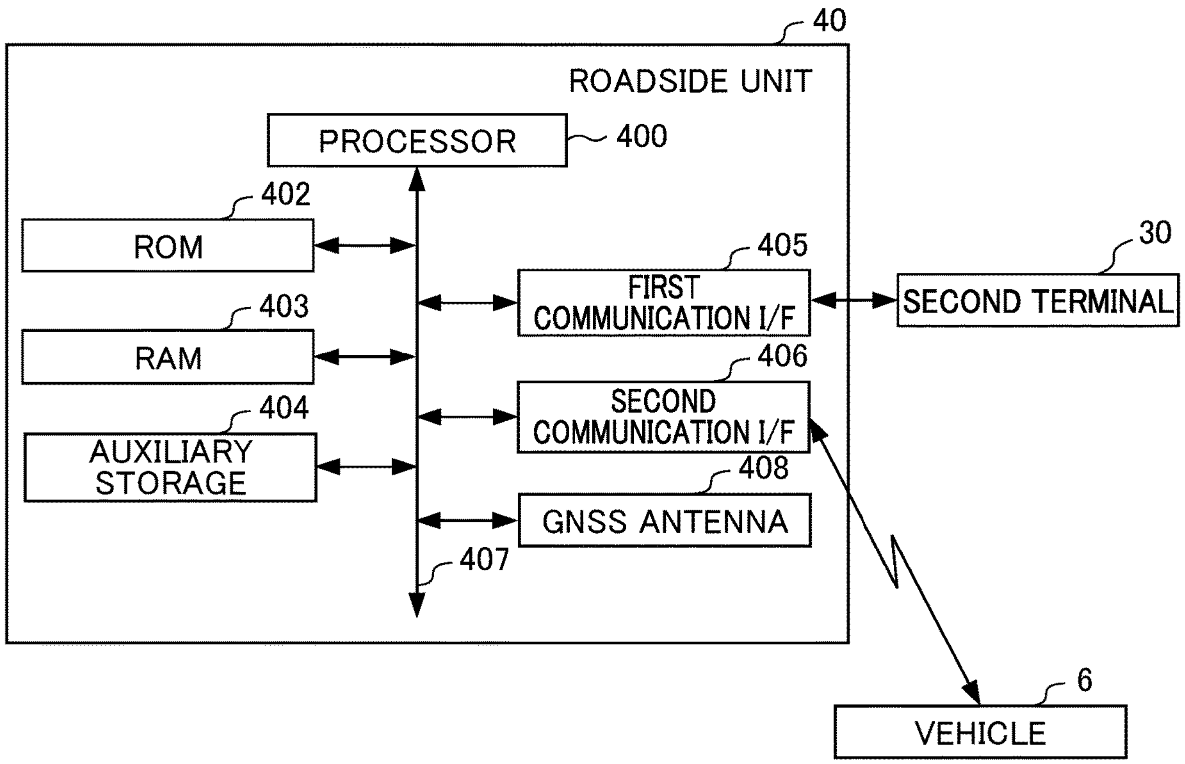
FIG. 5 is a block diagram showing a hardware configuration of a roadside unit according to an embodiment of the present invention.

An example of a hardware configuration of the roadside unit 40 will be described next. FIG. 5 is a block diagram showing the hardware configuration of the roadside unit 40.

As an example, the roadside unit 40 includes a processor 400, a ROM 402, a RAM 403, an auxiliary storage 404, a first communication I/F 405, a second communication I/F 406, and a GNSS antenna 408. These units are connected to each other through a bus 407 and others. The processor 400, the ROM 402, the RAM 403, the auxiliary storage 404, and the bus 407 of the roadside unit 40 have configurations similar to those of the above-described functional blocks of the gateway 10 and those of the first terminal 20 given the same names, so that descriptions thereof will be omitted.

The first communication I/F 405 is an interface for the roadside unit 40 to make communication through the PON access system 50. The roadside unit 40 connects to and communicates with the second terminal 30 through the first communication I/F 405. By doing so, the roadside unit 40 connects to the network communication grid NW through the first communication interface I/F 405, the second terminal 30, the line L, the first terminal 20, and the gateway 10.

The second communication interface I/F 406 is an interface for the roadside unit 40 to make V2X communication by radio with a peripheral device. The roadside unit 40 communicates through the second communication I/F 406 with the vehicle 6 traveling in the communicable area A, for example.

The GNSS antenna 408 receives a GNSS signal and others. The GNSS signal is transmitted from a navigation satellite forming a GNSS such as a global positioning system (GPS) or a quasi-zenith satellite system, for example. The processor 400 acquires positional information about the roadside unit 40 from the GNSS signal, for example. Then, the processor 400 of the roadside unit 40 instructs the first communication I/F 405 to transmit the positional information to the server 7. In response to this instruction for transmission, the first communication I/F 405 transmits the positional information to the server 7. The transmitted positional information is received by the communication I/F 705 of the server 7. The processor 700 of the server 7 stores the received positional information into the auxiliary storage 704.

Moreover, the processor 400 adjusts time using a GNSS signal. Alternatively, the processor 400 may adjust time by a method using a network time protocol (NTP) or a precision time protocol (PTP), for example.

Figure 6:
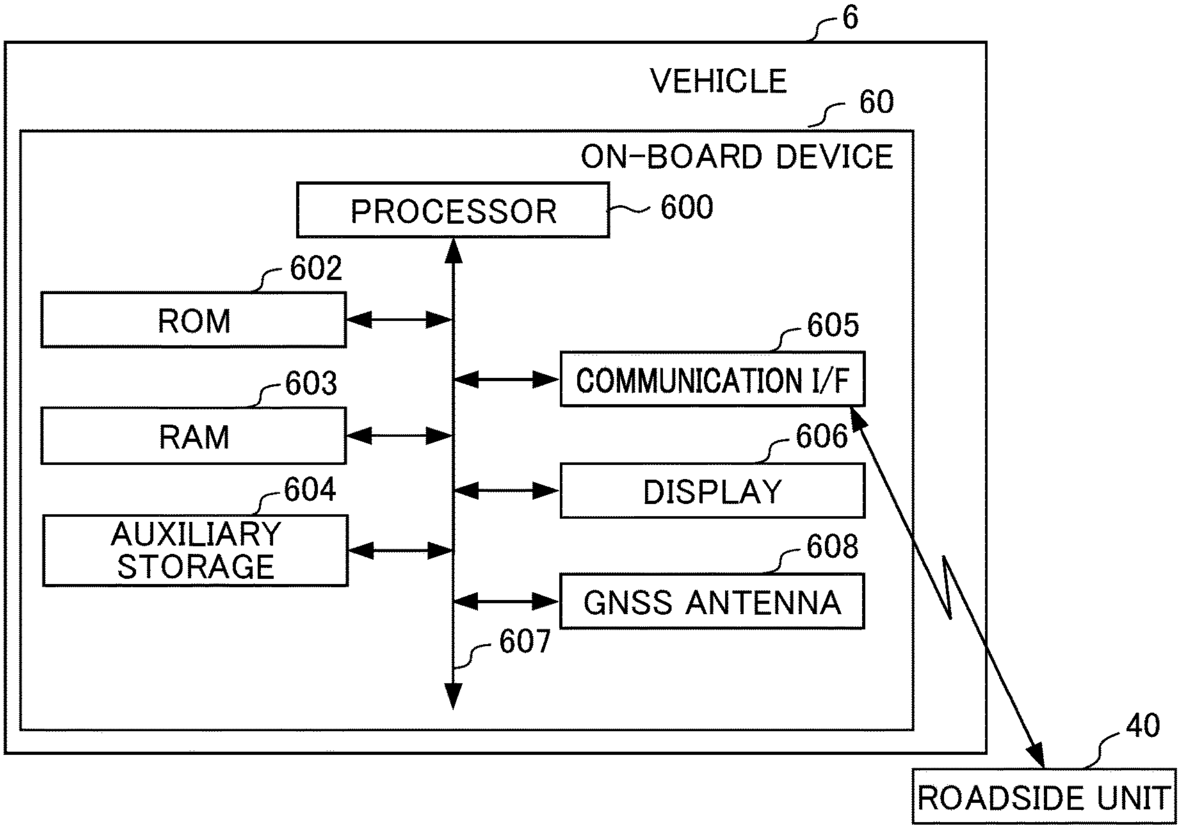
FIG. 6 is a block diagram showing a hardware configuration of a vehicle according to an embodiment of the present invention.

An example of a hardware configuration of the vehicle 6 will be described next. FIG. 6 is a block diagram showing the hardware configuration of the vehicle 6.

The vehicle 6 includes an on-board device 60. The on-board device 60 has a function of using car navigation, an intelligent transportation system (ITS), and V2X communication, for example. As an example, the on-board device 60 includes a processor 600, a ROM 602, a RAM 603, an auxiliary storage 604, a communication I/F 605, a display 606, and a GNSS antenna 608. These units are connected to each other through a bus 607 and others. The processor 600, the ROM 602, the RAM 603, the auxiliary storage 604, and the bus 607 of the on-board device 60 have configurations similar to those of the above-described functional blocks of the gateway 10 and others, so that descriptions thereof will be omitted.

The communication I/F 605 is an interface for the vehicle 6 to communicate with the roadside unit 40 through V2X communication, for example. The vehicle 6 connects to the PON access system 50 and the network communication grid NW through the roadside unit 40.

The display 606 displays a screen for presenting various types of information to an operator of the vehicle 6. For example, the display 606 is a display such as a liquid crystal display or an organic electroluminescence (EL) display.

The GNSS antenna 608 receives a GNSS signal and others. The processor 600 receives positional information about the on-board device 60 from the GNSS signal, for example.

Figure 7:
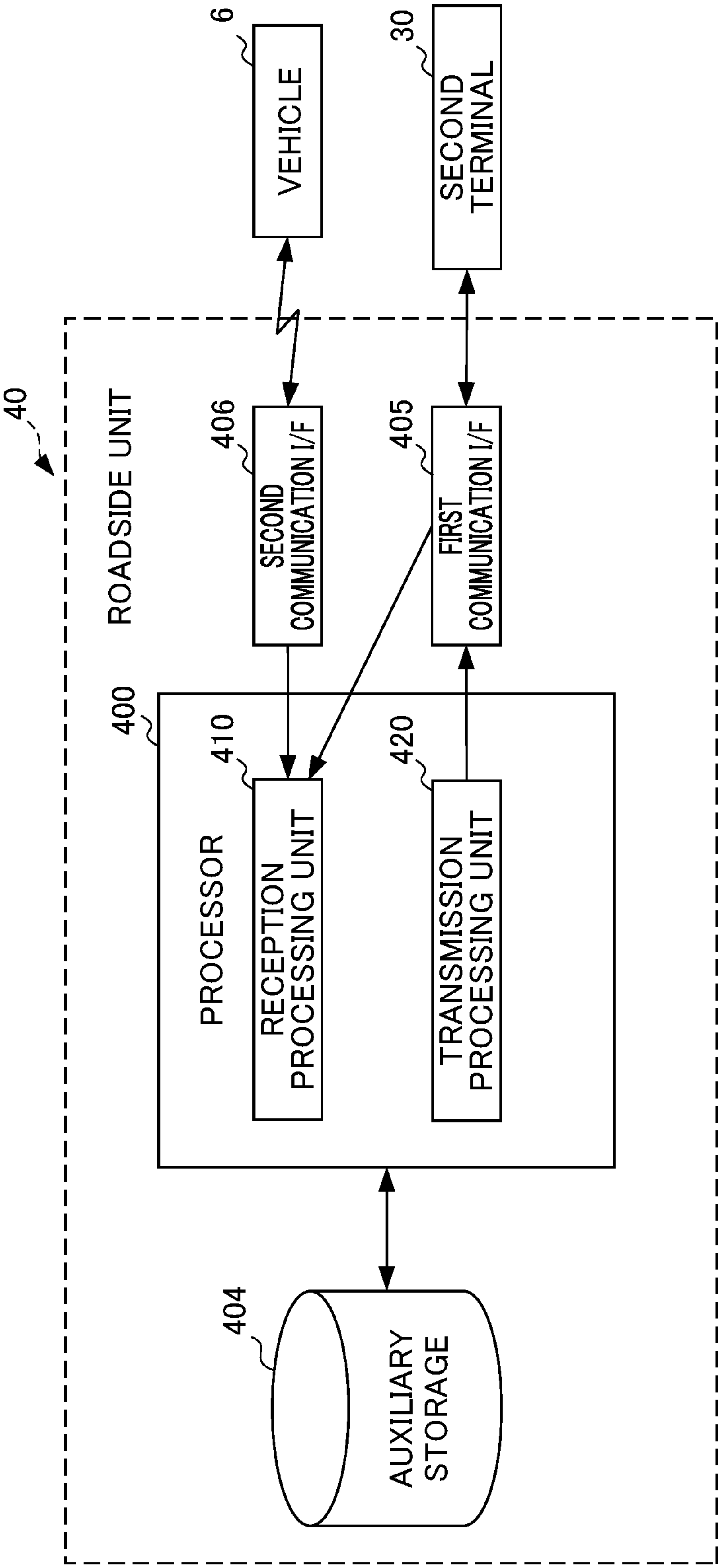
FIG. 7 is a functional block diagram of the roadside unit according to an embodiment of the present invention.

The following describes a functional configuration of the roadside unit 40 to make the communication system 1 perform road-to-vehicle communication. FIG. 7 is a functional block diagram showing a part of the functional configuration of the roadside unit 40.

The road-to-vehicle communication by the roadside unit 40 is realized mainly by the processor 400. The processor 400 includes a reception processing unit 410 and a transmission processing unit 420.

The reception processing unit 410 performs a process for receiving data from the vehicle 6 through the second communication I/F 406 and a process for receiving data from the second terminal 30 through the first communication I/F 405.

The reception processing unit 410 acquires vehicle information about the vehicle 6 traveling in the communicable area A by making radio communication through the second communication I/F 406. Examples of the vehicle information acquired by the reception processing unit 410 include travel information and identification information about the vehicle 6. The travel information may include positional information, velocity information, destination information, information about a traveling-intended path, and steering information about a vehicle. Examples of the identification information include an MAC address and IPv6 of the on-board device 60, and license plate information. The vehicle information is acquired from the on-board device 60 belonging to the vehicle 6, for example.

The reception processing unit 410 further receives vehicle information acquired by the roadside unit 40 different from its own roadside unit 40 and transmitted from the server 7. Thus, the roadside unit 40 is configured to acquire vehicle information about the vehicle 6 traveling in the communicable area A communicable with its own roadside unit 40 and to acquire vehicle information about the vehicle 6 traveling in the communicable area A different from current own communicable area A.

The transmission processing unit 420 performs a process of transmitting the vehicle information received by the reception processing unit 410 to the server 7 through the PON access system 50, the gateway 10, and others.

Figure 8:
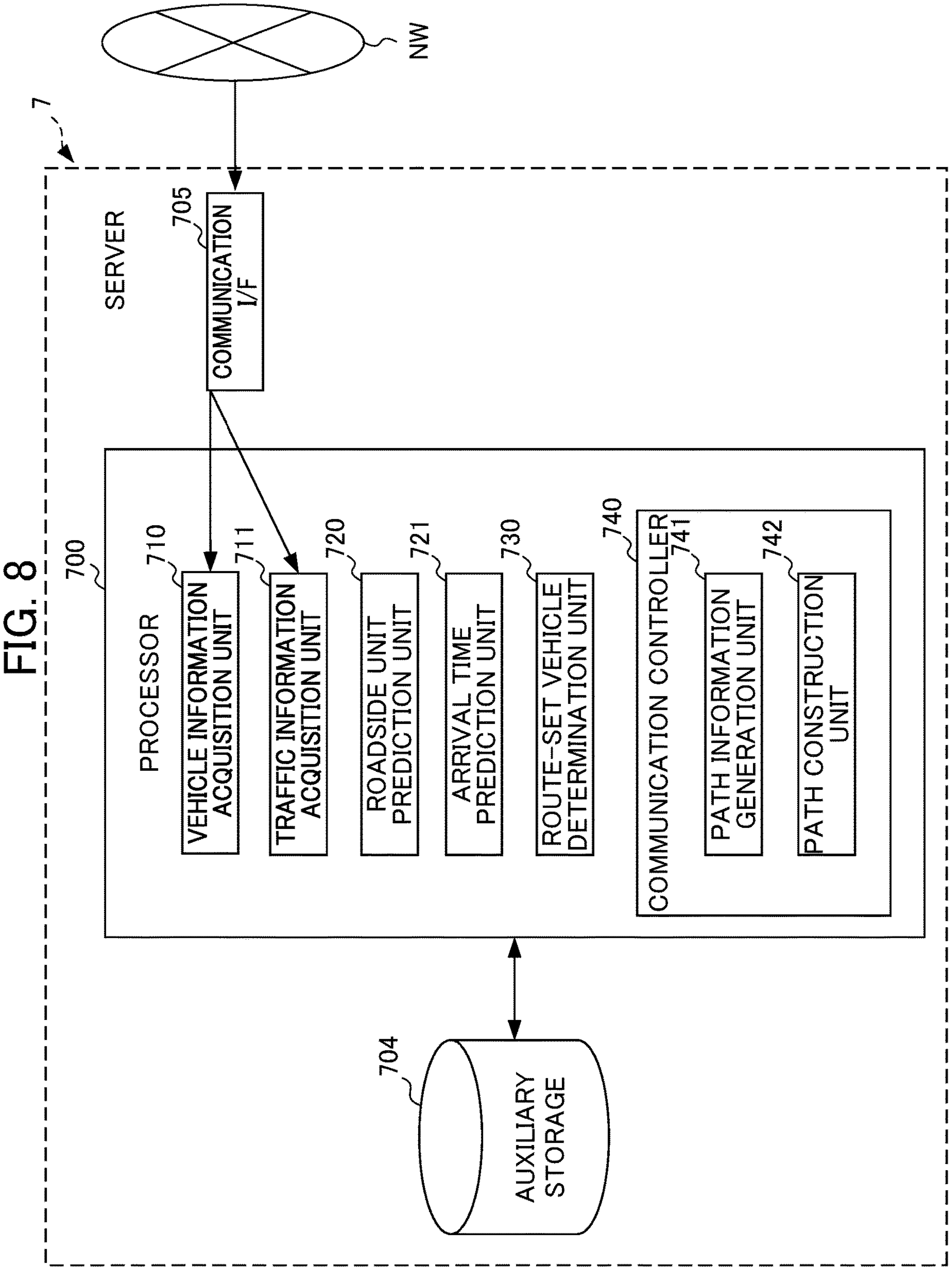
FIG. 8 is a functional block diagram of the server according to an embodiment of the present invention.

The following describes a functional configuration of the server 7 relating to road-to-vehicle communication. FIG. 8 is a functional block diagram showing a part of the functional configuration of the server 7.

The road-to-vehicle communication by the server 7 is mainly realized by the processor 700. During the road-to-vehicle communication by the communication system 1, the server 7 functions as an SDN controller. Thus, the processor 700 of the server 7 executes control as a control plane to manage communication through the plurality of roadside units 40, a plurality of the second terminals 30, a plurality of the first terminals 20, and the gateway 10 existing in the communication system 1.

The control as a control plane is control executed to generate path information or manage communication operation for a data transfer process performed by each communication device on a network. As shown in FIG. 1, in the present embodiment, the server 7 performs a process of transferring data received by the roadside unit 40, the first terminal 20, the gateway 10 or the like, and the server 7 generates a path information for the data transfer process using the roadside unit 40, the first terminal 20, the gateway 10, and others, for example. Thus, as shown in FIG. 1, a virtual network NW2 collectively managed by the server 7 is formed. This eliminates a need for setting each communication device on the virtual network NW2 individually to facilitate management of the communication system 1 as a whole. The auxiliary storage 704 or the ROM 702 stores software to make the server 7 function as the SDN controller. The auxiliary storage 704 or the ROM 702 further stores positional information or connection information about each roadside unit 40, each second terminal 30, each first terminal 20, and the gateway 10 in the communication system 1.

The processor 700 of the server 7 includes a vehicle information acquisition unit 710, a traffic information acquisition unit 711, a roadside unit prediction unit 720, an arrival time prediction unit 721, a route-set vehicle determination unit 730, and a communication controller 740.

The vehicle information acquisition unit 710 acquires vehicle information about the vehicle 6 traveling in the communicable area A communicable with the roadside unit 40. As shown by a communication path P1 indicated by solid arrows in FIG. 1, for example, the vehicle information acquisition unit 710 acquires vehicle information having been transferred from the roadside unit 40 and having passed through the PON access system 50, the gateway 10, and the network communication grid NW in this order.

The traffic information acquisition unit 711 acquires traffic information about the road 2 on which the vehicle 6 travels. Examples of the traffic information to be acquired include traffic light information about a status of a signal such as go-ahead indication or stop instruction indicated by a traffic light provided on the road 2 and the timing of switching of such a signal, and congestion information indicating the congestion condition on the road 2. The traffic information acquisition unit 711 may acquire traffic information from the roadside unit 40 communicating with a traffic light or from a public institution that collects and provides road traffic information, for example.

The roadside unit prediction unit 720 predicts the roadside unit 40 to communicate with the vehicle 6 (hereinafter called a communication-intended roadside unit) based on travel information acquired by the vehicle information acquisition unit 710 and positional information about a different roadside unit 40 in the communication system 1 stored, for example, in the auxiliary storage 704. Thus, the roadside unit prediction unit 720 predicts the roadside unit 40 installed in an intended area where the vehicle 6 is predicted to travel. Specifically, the roadside unit prediction unit 720 predicts a traveling path for the vehicle 6 based on the travel information, and identifies the roadside unit 40 installed on a traveling path predicted using the predicted traveling path and the positional information about the other roadside unit 40. The roadside unit prediction unit 720 may predict the traveling path using positional information, velocity information, steering information and others about the vehicle 6, or may predict the traveling path using positional information and destination information and others about the vehicle 6, for example. The roadside unit prediction unit 720 may predict the communication-intended roadside unit using a traveling path for the vehicle 6 registered with the on-board device 60.

The arrival time prediction unit 721 predicts arrival time of the vehicle 6 at the intended area where the vehicle 6 is predicted to travel based on the vehicle information, the traffic information, and information about the communication-intended roadside unit predicted by the roadside unit prediction unit 720. The arrival time prediction unit 721 predicts the arrival time using positional information about the intended area where the vehicle 6 is predicted to travel (an area where the communication-intended roadside unit is set), congestion information or traffic light information on the way to the intended area, the travel information about the vehicle 6 such as a travel speed and others, for example.

The route-set vehicle determination unit 730 determines whether the vehicle 6 is a route-set vehicle based on the identification information about the vehicle 6 acquired by the vehicle information acquisition unit 710. The route-set vehicle is the vehicle 6 for which its destination is determined in advance. Examples of the route-set vehicle include a bus and a taxi.

If the route-set vehicle determination unit 730 determines that the vehicle 6 with which radio communication is performed, is the route-set vehicle, the roadside unit prediction unit 720 predicts every roadside unit 40 that is installed in an intended area where the route-set vehicle intends to pass through before arriving at its destination registered with the route-set vehicle to be the communication-intended roadside unit.

The communication controller 740 executes the control as a control plane to manage communication through the gateway 10, the first terminal 20, the roadside unit 40, and others. For example, the communication controller 740 constructs a communication path P2 in the virtual network NW2 leading to the roadside unit 40 predicted to be the communication-intended roadside unit before the arrival time, predicted by the arrival time prediction unit 721. The communication controller 740 includes a path information generation unit 741 and a communication path construction unit 742.

The path information generation unit 741 generates path information for constructing the communication path P2 from the server 7 to the communication-intended roadside unit based on the result of the prediction by the roadside unit prediction unit 720 and positional information or connection information about each communication unit in the communication system 1 stored, for example, in the auxiliary storage 704.

The communication path construction unit 742 constructs the communication path P2 based on the path information generated by the path information generation unit 741. The communication path construction unit 742 controls the communication units in the communication system 1 including the gateway 10, the first terminal 20, and the roadside unit 40, and updates a routing table or an MAC address table of a router (not shown in the drawings) provided for each of these units.

Moreover, the communication path construction unit 742 performs a process of transmitting the vehicle information to each communication device located on the communication path P2 covering the roadside unit 40 predicted to be the communication-intended roadside unit by the roadside unit prediction unit 720. Like in a case along the communication path P2 indicated by dashed arrows in FIG. 1, for example, the vehicle information is transferred from the server 7, passes through the network communication grid NW, the gateway 10, and the PON access system 50 in this order, and is then carried to the communication-intended roadside unit. Then, the communication controller 740 allocates radio resources for the roadside unit 40 to the vehicle 6 and sets a state where the communication devices located on the communication path P2 can communicate with each other before the arrival time predicted by the arrival time prediction unit 721.

Figure 9:
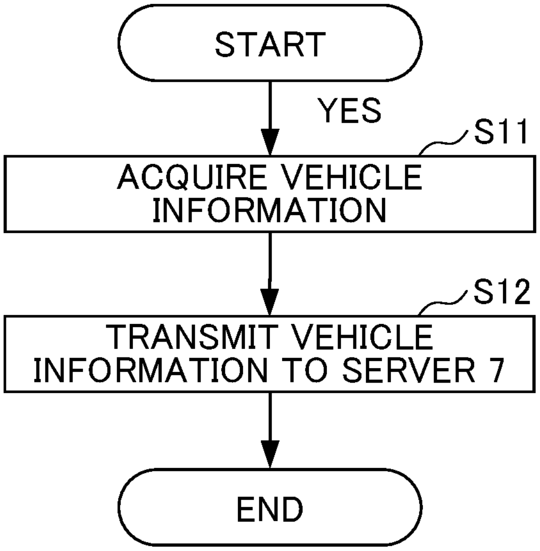
FIG. 9 is a flowchart showing an example of a process flow followed by the roadside unit during road-to-vehicle communication by the communication system according to an embodiment of the present invention.
Figure 10:
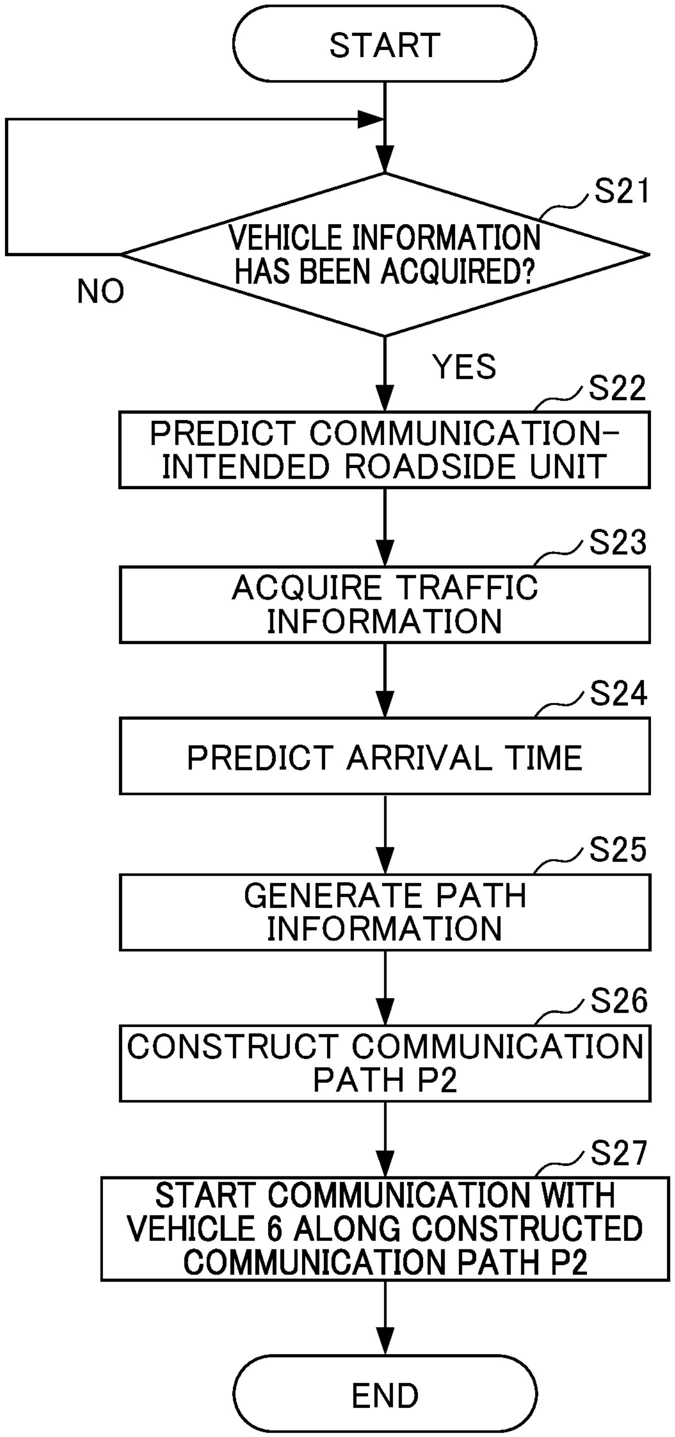
FIG. 10 is a flowchart showing an example of a process flow followed by the server during road-to-vehicle communication by the communication system according to an embodiment of the present invention.

The following describes a flow of the handover process performed by the communication system 1 according to the present embodiment by referring to FIGS. 9 and 10. In the following description of behavior, the substance of the process is given as an example and various processes capable of obtaining comparable results are applicable as appropriate. FIG. 9 is a flowchart showing an example of a process performed by the roadside unit 40 making radio communication with the vehicle 6. The processor 400 performs the process in FIG. 9 using a program stored in the ROM 402 or the auxiliary storage 404, for example. FIG. 10 is a flowchart showing an example of a process performed by the processor 700 of the server 7. The processor 700 performs the process in FIG. 10 using a program stored in the ROM 702 or the auxiliary storage 704, for example.

The reception processing unit 410 of the processor 400 acquires vehicle information through radio communication from the vehicle 6 traveling in the communicable area A communicable with the roadside unit 40 (step S11). Specifically, the reception processing unit 410 acquires travel information including positional information, velocity information, destination information, information about a traveling-intended path, and steering information, and acquires identification information about the vehicle 6 such as an MAC address or IPv6 of the on-board device 60 from the on-board device 60 on the vehicle 6.

The transmission processing unit 420 transmits the vehicle information acquired in step S11 to the server 7 through the PON access system 50, the gateway 10, and others (step S12).

As shown in FIG. 10, the processor 700 of the server 7 determines whether the vehicle information transmitted from the transmission processing unit 420 has been acquired (step S21). If the processor 700 determines that the vehicle information has been acquired (step S21: YES), the processor 700 moves to a process in step S22. Meanwhile, if the processor 700 determines that the vehicle information has not been acquired (step S21: NO), the processor 700 repeats the same process.

The roadside unit prediction unit 720 predicts a communication-intended roadside unit based on the vehicle information acquired in step S21 and positional information about the roadside unit 40 in the communication system 1 stored, for example, in the auxiliary storage 704 (step S22). If the route-set vehicle determination unit 730 determines that the vehicle 6 with which radio communication is performed, is a route-set vehicle, the roadside unit prediction unit 720 predicts all roadside units 40 installed on an intended path through which the vehicle 6 is to pass before arriving at its destination registered with the vehicle 6, and determines these roadside units 40 to be communication-intended roadside units.

The traffic information acquisition unit 711 acquires traffic information on the way to an area where the communication-intended roadside unit predicted in step S22 is installed from the roadside unit 40 or from a public institution, for example (step S23).

The arrival time prediction unit 721 predicts arrival time of the vehicle 6 at the intended area where the vehicle 6 is predicted to travel (the area where the communication-intended roadside unit is set) using positional information about the intended area, congestion information or traffic light information on the way to the intended area, and the travel information about the vehicle 6 such as traveling speed among others (step S24).

The path information generation unit 741 generates path information about a path to the roadside unit 40 predicted as the communication-intended roadside unit in step S22 before the arrival time predicted in step S24 (step S25). Specifically, the path information generation unit 741 generates path information for constructing the communication path P2 from the server 7 to the communication-intended roadside unit based on the positional information or connection information about each communication unit in the communication system 1 stored, for example, in the auxiliary storage 704.

Using the path information generated in step S25, the communication path construction unit 742 controls the gateway 10, the first terminal 20, and the roadside unit 40 and updates routing tables of routers provided for these units before the arrival time predicted in step S24 (step S26). Specifically, the communication path construction unit 742 registers an IP address or an MAC address of the communication-intended roadside unit as a destination address with the routing table for each of the gateway 10 and the first terminal 20 on the communication path P2. Then, the communication path construction unit 742 transmits the vehicle information to each communication device located on the communication path P2. The processor 700 performs the processes in step S25 and step S26 before the arrival time predicted in step S24 to construct the communication path P2 between the roadside unit 40 predicted in step S22 and each communication device such as the first terminal 20. This process of constructing the communication path P2 provides part of the handover process described above.

When the vehicle 6 arrives at the communicable area A communicable with the roadside unit 40 predicted to be the communication-intended roadside unit, the communication controller 740 controls communication operations such as those of this roadside unit 40 and the gateway 10, the first terminal 20 and others located on the communication path P2 constructed in step S26, thereby causing these units to start communication with the vehicle 6 (step S27). If the vehicle 6 travels in an area where the roadside unit 40 different from the roadside unit 40 predicted to be the communication-intended roadside unit is set, the processor 700 performs the processes in step S25 and step S26 with high priority to construct the communication path P2 between the other roadside unit 40 and the server 7.

The above-described embodiment achieves the following effects.

The communication system 1 according to the present embodiment includes: the plurality of roadside units 40 installed in respective areas that acquires travel information about the vehicle 6 through radio communication; the first terminal 20 to which the plurality of roadside units 40 is connected; and the server 7 that executes control as a control plane to acquire the travel information from the roadside unit 40, predict the roadside unit 40 belonging to the plurality of roadside units 40 and installed in an intended area where the vehicle 6 is predicted to travel and predict arrival time at the intended area based on the acquired travel information, and manage communication through the roadside unit 40 and the first terminal 20 so as to construct the communication path P2 between the predicted roadside unit 40 and the first terminal 20 before the arrival time.

As a result, the communication path P2 can be set between a roadside unit 40 predicted to be the unit to be passed through by the vehicle 6 and the first terminal 20, for example. This makes it possible to set a connection state for the set communication path P2 or allocate radio resources to the vehicle 6 in advance. Furthermore, the server 7 functions as an SDN controller to collectively control generation of path information required for the process of data transfer between the roadside unit 40 and the first terminal 20, setting for communication and others. Thus, even if the communication system 1 is provided for a wide area, it is still possible to reduce burden or cost involved in operation, expansion, management, maintenance, etc. of the system. Thus, it is possible to smoothly switch the roadside unit 40 to make radio communication with the traveling vehicle 6 while reducing cost for an infrastructure.

In the communication system 1 according to the present embodiment, the travel information includes positional information, velocity information, destination information, and steering information about the vehicle 6.

As a result, it is possible to more correctly predict an area where the vehicle 6 is predicted to travel.

In the communication system 1 according to the present embodiment, the communication system 1 further includes a plurality of the second terminals 30 (ONUs) connected to the first terminal 20, and the first terminal 20 is an OLT and provides the PON access system 50 together with a plurality of the second terminals 30.

This provides connection of the plurality of roadside units 40 collectively to one first terminal 20 through the second terminal 30, making it possible to reduce costs for placement of the line L formed of an optical fiber, for example. Furthermore, as the PON access system 50 provides connection of the plurality of roadside units 40 to one first terminal 20, signals flowing through the optical fiber are more likely to collide with each other. This can be handled by allocation of radio resources for the roadside unit 40 to the vehicle 6, setting of a connection state along the communication path in advance, and others. By doing so, it is possible to reduce costs further for infrastructure installation and to perform the handover process smoothly.

In the communication system 1 according to the present embodiment, the roadside unit 40 acquires identification information about the vehicle 6, the server 7 determines based on the identification information whether the vehicle 6 is a route-set vehicle where its destination is predetermined, and if the vehicle 6 is determined to be the route-set vehicle, the server 7 predicts two or more of the plurality of roadside units 40 installed in an intended area where the vehicle 6 is to pass through before arriving at the destination of the route-set vehicle and constructs the communication path P2 between each of the two or more predicted roadside units 40 and the first terminal 20.

As a result, it is possible to collectively make predictions for the plurality of roadside units 40 to be passed through before arriving at the destination and set communication paths to these roadside units 40 together, so that cost for the handover process can be reduced.

A communication method according to the present embodiment is executed by the communication system 1 including the plurality of roadside units 40 installed in respective areas, and the first terminal 20 to which the plurality of roadside units 40 is connected. The method includes: a travel information acquisition step of acquiring travel information about the vehicle 6 through radio communication from the roadside unit 40; a prediction step of predicting the roadside unit 40 belonging to the plurality of roadside units 40 and installed in an intended area where the vehicle 6 is predicted to travel and predicting the arrival time at the intended area based on the travel information acquired in the travel information acquisition step; and a communication control step of executing control as a control plane to manage communication through the roadside unit 40 and the first terminal 20 so as to construct a communication path between the roadside unit 40 predicted in the prediction step and the first terminal 20 before the arrival time.

As a result, the communication path P2 can be set between a roadside unit 40 predicted to be the unit to be passed through by the vehicle 6 and the first terminal 20, for example. This makes it possible to set a connection state for the set communication path P2 or allocate radio resources to the vehicle 6 in advance. Furthermore, the server 7 functions as an SDN controller to collectively control generation of path information required for the process of data transfer between the roadside unit 40 and the first terminal 20, setting for communication and others. Thus, even if the communication system 1 is provided for a wide area, it is still possible to reduce the burden or costs involved in operation, expansion, management, maintenance, etc. of the system. Thus, it is possible to smoothly switch the roadside unit 40 to make radio communication with the traveling vehicle 6 while reducing cost for an infrastructure.

A non-transitory computer-readable storage medium storing a program according to the present embodiment causes a computer incorporated in the communication system 1 to execute a function. The communication system 1 includes the plurality of roadside units 40 installed in respective areas, and the first terminal 20 to which the plurality of roadside units 40 is connected. The function includes: travel information acquisition function of acquiring travel information about the vehicle 6 through radio communication from the roadside unit 40; a prediction function of predicting the roadside unit 40 belonging to the plurality of roadside units 40 and installed in an intended area where the vehicle 6 is predicted to travel and predicting the arrival time at the intended area based on the travel information acquired by the travel information acquisition function; and a communication control function of executing control as a control plane to manage communication through the roadside unit 40 and the first terminal 20 so as to construct the communication path P2 between the roadside unit 40 predicted by the prediction function and the first terminal 20 before the arrival time.

As a result, the communication path P2 can be set between a roadside unit 40 predicted to be the unit to be passed through by the vehicle 6 and the first terminal 20, for example. This makes it possible to set a connection state for the set communication path P2 or allocate radio resources to the vehicle 6 in advance. Furthermore, the server 7 functions as an SDN controller to collectively control generation of path information required for the process of data transfer between the roadside unit 40 and the first terminal 20, setting for communication and others. Thus, even if the communication system 1 is provided for a wide area, it is still possible to reduce burden or cost involved in running, expansion, management, maintenance, etc. of the system. Thus, it is possible to smoothly switch the roadside unit 40 to make radio communication with the traveling vehicle 6 while reducing cost for an infrastructure.

While the embodiment of the present invention has been described above, the present invention is not limited to the above-described embodiment but can be changed, as appropriate.

In the above-described embodiment, the communication system 1 has a point-to-multipoint (P2MP) network communication grid such as the PON access system 50 formed between the plurality of roadside units 40 and the server 7. However, the communication system 1 may have a plurality of network topologies such as a point-to-point (P2P) network communication grid and a ring network other than the PON access system 50. Alternatively, the communication system 1 may include a unit such as a layer 2 switch (L2SW) other than the PON access system 50.

In the above-described embodiment, routers provided for the roadside unit 40, the first terminal 20, and the gateway 10 are configured as hardware. However, these router may be virtual routers prepared by installing software for providing a routing function on the respective units. This makes it possible to reduce the burden or costs further involved in maintenance, management, and expansion of the communication system 1 as a whole.

As an example, software providing the server 7 with a function as an SDN controller or positional information or connection information about each roadside unit 40, each second terminal 30, each first terminal 20, or the gateway 10 in the communication system 1 may be stored not in the auxiliary storage 704 or the ROM 702 but may be stored in a database provided outside the server 7.

As an example, the processor 700 of the server 7 may have a configuration without the route-set vehicle determination unit 730.

EXPLANATION OF REFERENCE NUMERALS

1 Communication system
6 Vehicle
7 Server
20 First terminal (terminal)
40 Roadside unit
700 Processor

What is claimed is:

1. A communication system comprising:
   - a plurality of roadside communication devices installed in respective areas and configured to acquire travel information about a vehicle through radio communication, each of the plurality of roadside communication devices including circuitry;
   - a terminal to which the plurality of roadside communication devices are connected; and
   - a server configured to execute control as a control plane to:
     - acquire the travel information from at least one of the plurality of roadside communication devices;
     - predict a roadside communication device, among the plurality of roadside communication devices, that is installed in an intended area where the vehicle is predicted to travel;
     - predict an arrival time at the intended area based on the acquired travel information; and manage communication through the roadside communication device and the terminal by, prior to the predicted arrival time, constructing a communication path between the predicted roadside communication device and the terminal, wherein constructing the communication path includes, by the server executing control as the control plane and before the vehicle enters a communicable area of the predicted roadside communication device, updating a routing table of the terminal to route traffic to the predicted roadside communication device, and allocating radio resources to the predicted roadside communication device for vehicle communication.

2. The communication system according to claim 1, wherein the travel information includes positional information, velocity information, and destination information of the vehicle.

3. The communication system according to claim 1, further comprising: a plurality of ONUs connected to the terminal, wherein the terminal is an OLT and provides a PON access system together with a plurality of the ONUs.

4. The communication system according to claim 1, wherein the roadside communication device acquires identification information about the vehicle, the server determines based on the identification information whether the vehicle is a route-set vehicle for which its destination is determined in advance, and if the vehicle is determined to be the route-set vehicle, the server predicts two or more of the plurality of roadside communication devices located in an intended area where the vehicle intends to pass through before arriving at the destination of the route-set vehicle and constructs a communication path between each of the two or more predicted roadside communication devices and the terminal.

5. A communication method executed by a communication system including a plurality of roadside communication devices installed in respective areas, each of the plurality of roadside communication devices including circuitry, and a terminal to which the plurality of roadside communication devices are connected, the method comprising:

acquiring travel information about a vehicle through radio communication from at least one of the plurality of roadside communication devices;

predicting a roadside communication device, among the plurality of roadside communication devices, that is installed in an intended area where the vehicle is predicted to travel;

predicting an arrival time at the intended area based on the acquired travel information; and executing control as a control plane to manage communication through the roadside communication device and the terminal by, prior to the predicted arrival time, constructing a communication path between the predicted roadside communication device and the terminal, including, by a server and before the vehicle enters a communicable area of the predicted roadside communication device, updating a routing table of the terminal to route traffic to the predicted roadside communication device, and allocating radio resources to the predicted roadside communication device for uninterrupted vehicle communication.

6. A non-transitory computer-readable storage medium storing a program where a computer incorporated in a communication system to execute a method, the communication system including a plurality of roadside communication devices installed in respective areas, each of the plurality of roadside communication devices including circuitry and a terminal to which the plurality of roadside communication devices are connected, the method comprising:

acquiring travel information about a vehicle through radio communication from at least one of a plurality of roadside communication devices;

predicting a roadside communication device, among the plurality of roadside communication devices, that is installed in an intended area where the vehicle is predicted to travel;

predicting an arrival time at the intended area based on the acquired travel information; and executing control as a control plane to manage communication through the roadside communication device and the terminal by, prior to the predicted arrival time, constructing a communication path between the predicted roadside communication device and the terminal, including, by a server and before the vehicle enters a communicable area of the predicted roadside communication device, updating a routing table of the terminal to route traffic to the predicted roadside communication device, and allocating radio resources to the predicted roadside communication device for vehicle communication.

* * * * *